May 23, 1950 J. T. STONE 2,508,730
REGULAR AND IRREGULAR SHAPES CUTTING MACHINE
Filed Aug. 28, 1944 2 Sheets-Sheet 1

Inventor
JOHN T. STONE.
By Howard J. Whelan.
Attorney

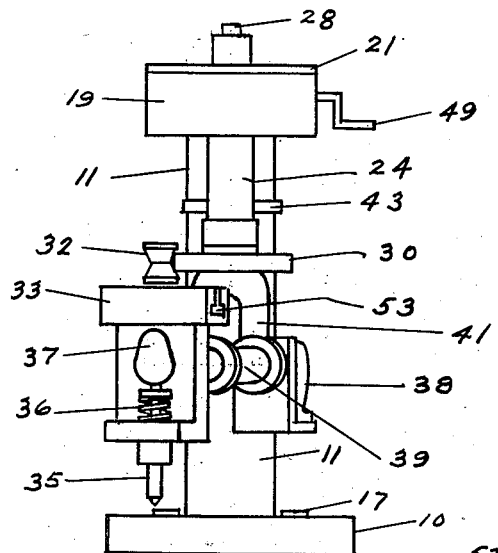
FIG. 3.
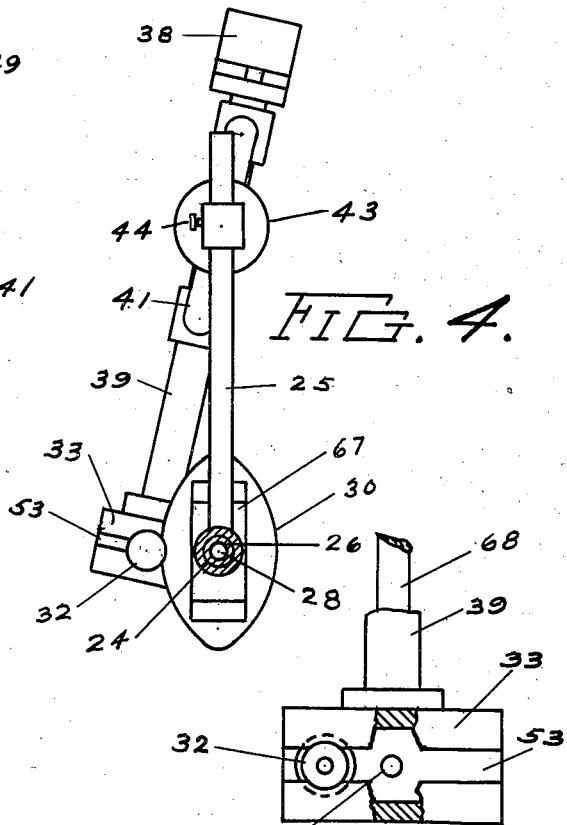
FIG. 4.
FIG. 7.
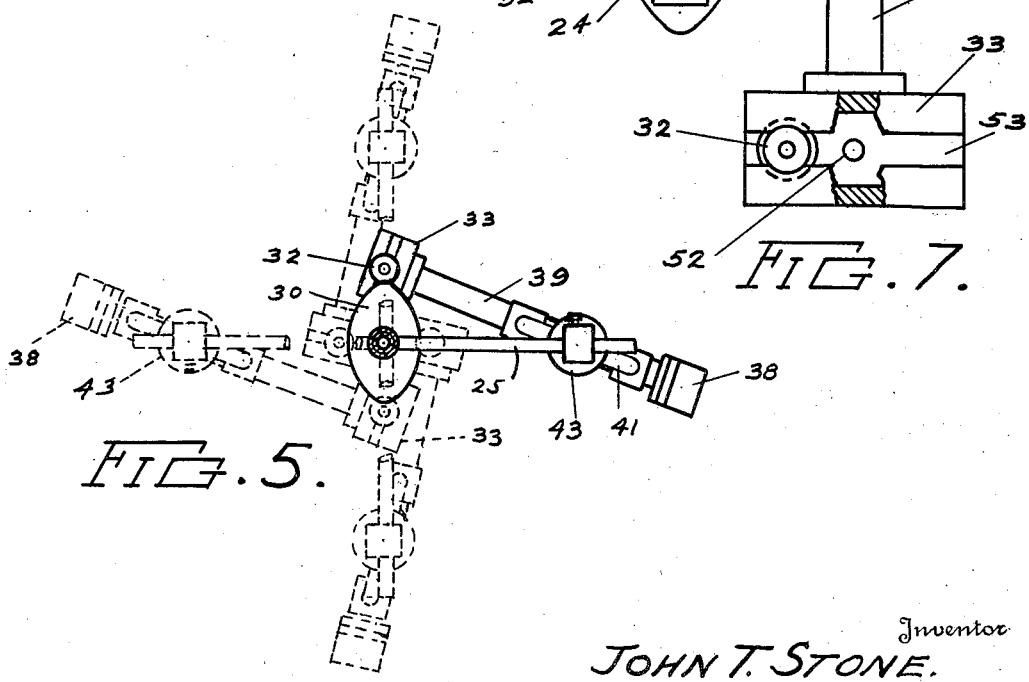
FIG. 5.
Inventor
JOHN T. STONE.
By Howard J. Whelan
Attorney Patented May 23, 1950

2,508,730

UNITED STATES PATENT OFFICE 2,508,730

REGULAR AND IRREGULAR SHAPES CUTTING MACHINE

John T. Stone, Baltimore, Md.

Application August 28, 1944, Serial No. 551,549

1 Claim. (Cl. 33—27)

This invention refers to cutting machines and more especially to a device for cutting irregular or regular shapes in material having a flat surface on which to work. It has among its objects to provide a simple structure for reproducing material according to selected templets attached thereto. Another object is to have the machine adapted for making regular outlines without the use of a templet. A further object is to provide for adjustability of the parts of the device so that it can be flexibly arranged for variable conditions and requirements. Still another object is to have the device adaptable for use for layouts and other incidental uses that may be obvious to those skilled in the art. Portability of the device is another object of the invention, as well as having particular adaptability for use with welding torches and the like.

Other objects will become apparent as the invention is more fully set forth.

The machines for doing cutting in plates and other flat surfaces in accordance with designated templets are somewhat restricted in their scope by reason of their relatively intricate construction and functioning. In this device, the templets may be attached quickly without any appreciable trouble. The other adjustments may be made by sliding parts on bars until they are positioned to suit. The structure consists mainly of a column with an arm extending therefrom carrying the parts that do the work and provide for the adjustments referred to.

In the drawings is shown a form of this invention, by way of example to illustrate the principles employed in devices embodied in this invention. In these drawings:

Figure 3 is an end elevation of the device shown in Figure 1 with the torch holder removed;

Figure 4 is a plan view of the rotating arm and cam mechanism taken along line 4—4 of Figure 2;

Figure 5 is a view similar to Figure 4 giving a diagrammatic view of the rotating arm and cam roller in various positions assumed during one complete revolution around the cam for cutting or punching irregular shapes;

Figure 7 is an enlarged plan view of the tool post slide head showing centering hole.

Similar reference characters refer to similar parts throughout the drawings.

Figure 1:
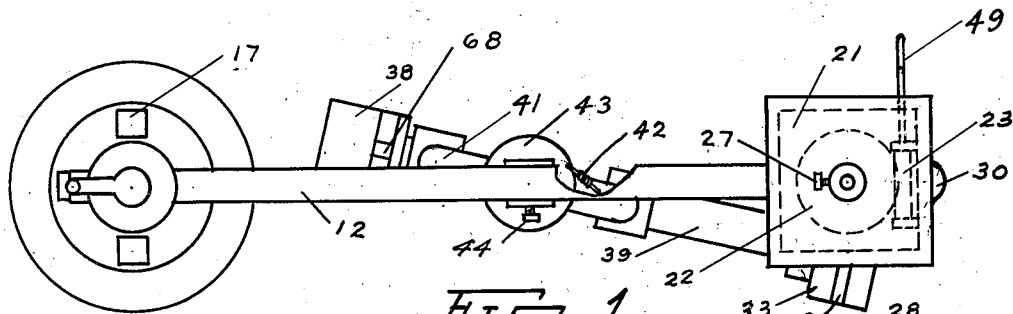
Figure 1 is a plan view of a form cutting machine embodying this invention.
Figure 2:
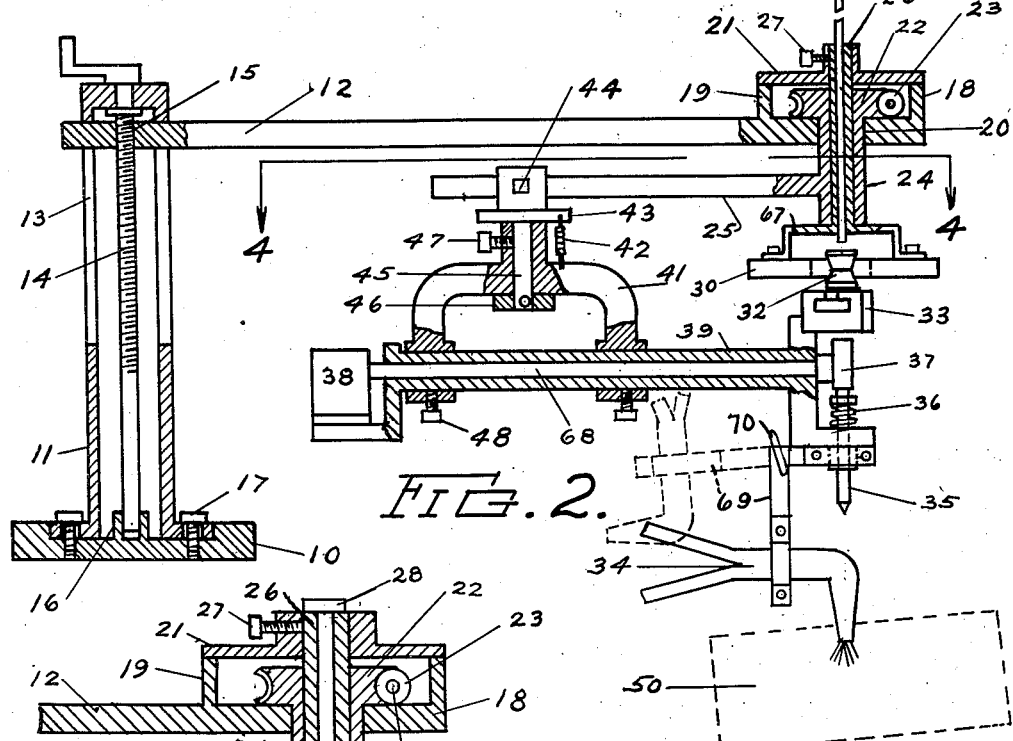
Figure 2 is a side elevation of the device shown in Figure 1 partly in section and with cutting torch attached to the tool post.
Figure 6:
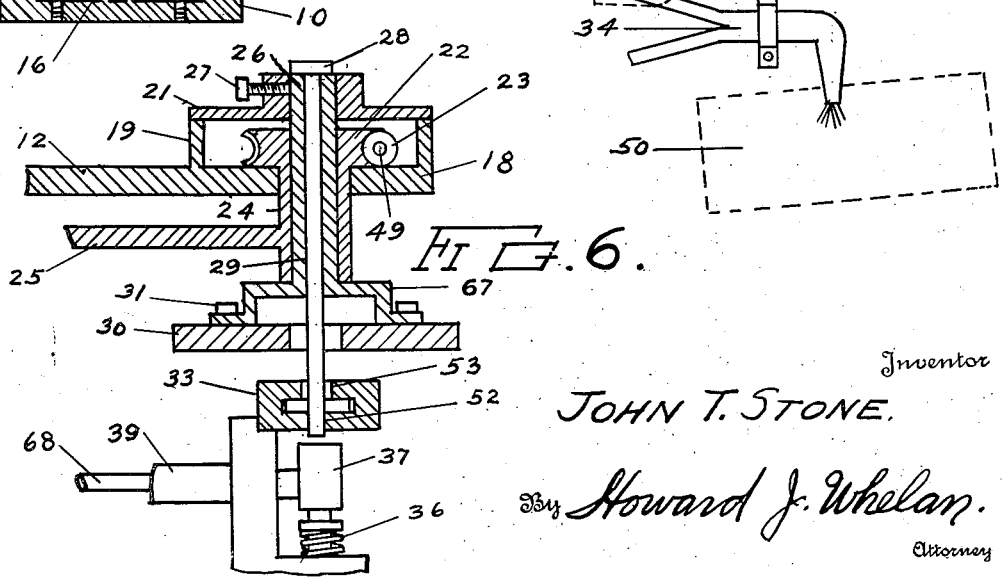
Figure 6 is a view of the rotating head in section showing method of centering same with the tool post for cutting or marking circles.

In the structure shown in the drawings 10 represents a base on which is mounted a stationary vertical column 11 which carries a spindle arm 12 radially out from the column. The arm 12 is raised and lowered vertically in slots 13 in the column through the rotation of a jack-screw 14 through screw-threads 15 provided in the portion of the spindle arm in the column. The bottom portion of the jack-screw 14 is supported in a bearing cup 16 formed integral in the base 10. Bolts 17 are used for attaching the column to the base and to allow the column to be rotated to various positions on base. At the outer end portion 18 of the spindle arm 12 is provided a box member 19 shown rectangular in form, and with a hole 20 through it. It has a cover 21 to protect the worm gear 22 and operating worm 23 therefor. The worm gear 22 is integrally connected to a hollow shaft 24 which extends through the hole 20 downwardly below the spindle arm 12 and has a radial arm 25 extending out from it and preferably of rectangular cross-section. This arm 25, carries the cutting and lay out equipment. This part of the device will be referred to more in detail in a later part of the description. Passing through the cover 21 and worm gear 22 is a hollow pipe like piece 26 held stationary to the cover by a set-screw 27. An inverted bracket 67 is provided on the lower portion of this piece 26. An elongated pin 28 passes down through the passage 29 in the part 26. This pin is utilized when it is desired to centralize the work on the machine. The bracket 67 supports the templet cam 30 removably by means of the bolts 31. A roller 32 makes peripheral contact with the templet cam 30 and is carried completely around same when in operation, by the head bracket 33 which is of channel-like form and arranged to hold a welding torch element 34, and prick punch arrangement 35. The spring 36 and cam head 37 serves to give the prick punch a tapping action in a conventional manner. This cam head is operated through a shaft 68 on which it is mounted and with which it rotates. This shaft 68 is operated by a motor 38 as indicated. The operating arm 39 is hollow and supports the shaft 68 within so it can revolve therein. This arm 39 also supports the motor 38. The arm 25 adjustably and slidably holds a collar member 43. The set-screw 44 holds it at any location on the arm 25. The post 45 and collar 46 serve to support a bifurcated bracket 41 in any rotative position on the post and this bracket can be secured in that position with a set-screw 47 when a circular cut is made. A spring 42 is normally used (with the set-screw 47 loosened) to place a tension on the arm 39, primarily to keep the roller 32 against the periphery of cam 30. The arm 39 is supported by the bracket as indicated in Figure 2 and after adjustment held in place by the set-screws 48.

In operation the worm 23 is rotated by a handle 49 extending out of the side of the box member 19. The rotation of the worm 23 causes the worm gear 22 to rotate with its shaft 24. This in turn carries the arm 25 around with the bracket 41 and its connections attached to it. The latter carries the arm 39 and makes roller 32, which is connected with it, follow the periphery of the cam 30, which makes the welding torch 34 cut a piece out of the plate 50 to be so treated. The spring 42 attached to the collar member 43 pulls bracket 41 around and resiliently allows the roller 32 to follow the contour of the cam templet 30, and carry the torch likewise. The cut follows the contour of the cam 30 and may be larger or smaller according to position of the roller 32 in the head 33 in the slot 53 with regard to the center post 52 over the center line of the torch 34. The head is indicated in Figure 7. When the prick punch arrangement 35 is employed for pricking out an outline in the plate, the torch and its set-screw 70 and holder 69 are swung out of the way and the mechanism 35 lowered by lowering arm 12 through the turning of the jackscrew 14 to suit. If the device is to be used for cutting a circular hole in the plate, the position of the torch (or prick punch) is adjusted to bring it and its holder to the proper or selected radius from the centerline of the worm gear by pushing the mechanism along the arm 25 to suit. The set-screw 47 is tightened in place. This allows the torch to be rotated around this center line as if it were directly attached to the arm 25. When the spring 42 is used, it enables the arm 39 to adjust itself to the travel of the roller 32 on the cam templet, and when the prick punch 35 is used it carries it through a similar contour, while the motor 38 operates to mark the plate accordingly, through its connection to the shaft 68 and hammer cam 37. The adjustment of the arm 39 in the bracket 41 can be made to suit the conditions requiring it.

While but one general form of the invention is shown in the drawings and described in the specifications, it is not desired to limit this application for patent to this particular form, as it is appreciated that other forms of construction could be made that would use the same principles and come within the scope of the appended claim.

Having thus described the invention, what is claimed is:

A machine of the type described comprising a base, a column mounted on said base, said column having parallel slots in the wall thereof, a screw supported in said base and within said column, a spindle arm in threaded engagement with said screw and guided in said slots, a gear housing at one end of said spindle arm, a worm and a cooperating worm gear supported in said housing, a bracket carried by said housing, a cam carried by said bracket, a tool in operative engagement with said cam, means for adjustably mounting said tool on said worm gear whereby said tool rotates with said worm gear when the worm gear is rotated, and means for rotating said worm.

JOHN T. STONE.

REFERENCES CITED

The following references are of record in the file of this patent:

UNITED STATES PATENTS

| Number | Name | Date |
| --- | --- | --- |
| 260,783 | Proctor | July 11, 1882 |
| 1,201,686 | Bugbee | Oct. 17, 1916 |
| 1,582,033 | Godfrey | Apr. 27, 1926 |
| 2,223,720 | Doyle | Dec. 3, 1940 |
| 2,252,146 | Walsh | Aug. 12, 1941 |
| 2,377,844 | Stone | June 5, 1945 |
| 2,388,376 | Young | Nov. 6, 1945 |

FOREIGN PATENTS

| Number | Country | Date |
| --- | --- | --- |
| 114,462 | Great Britain | Apr. 2, 1918 |